United States Patent Office 3,600,132
Patented Aug. 17, 1971

3,600,132
PROCESS FOR THE DETERMINATION OF THE HYDROXYPROLINE CONTENT OF BIOLOGICAL FLUIDS, AND DIAGNOSTIC PACKS FOR THIS DETERMINATION
Bastiaan Cornelis Goverde, Oss, Netherlands, assignor to Organon Inc., West Orange, N.J.
No Drawing. Filed Dec. 4, 1968, Ser. No. 781,243
Claims priority, application Netherlands, Dec. 11, 1967, 6716836
Int. Cl. C07d 27/00; G01n 31/04, 33/16
U.S. Cl. 23—230
10 Claims

ABSTRACT OF THE DISCLOSURE

Process for the determination of hydroxyproline in biological fluids, such as serum, urine, lumbar fluid and interarticular fluid. It comprises treating a sample with a strong acidic cation exchange resin, which adsorbs the free and peptide-bound hydroxyproline and hydrolyzing the adsorbed peptide-bound hydroxyproline by heating, whereafter the hydroxyproline is eluted and determined by means of a colour reaction. Besides, the invention comprises a diagnostic pack chiefly comprising a bottle with said resin, a tube for the performance of the adsorption and hydrolysis, a bottle with a standard quantity of hydroxyproline and a reagent for the performance of a colour reaction. In this way tracing of deviations in collagen metabolism can easily be performed.

BACKGROUND OF THE INVENTION

Hydroxyproline is an amino acid characteristic of collagen because it is chiefly found in this protein, an that in a ratio of more than 10%.

Collagen is one of the most important proteins, of the mammalian organism. In human beings it forms about one half of all body proteins, and it is a main constituent of the skin, tendons, bone, cartilage and connective tissue.

The amino acid composition of collagen is very typical because it is relatively poor in amino acids essential in human nutrition, while it is very rich in glycine, proline and hydroxyproline.

In the last few years much wider research has been carried out into the chemistry of collagen metabolism and a much deeper insight has been gained into it.

Studies with labelled compounds have shown that hydroxyproline is formed by hydroxylation from proline, which is peptide-bound in the primitive preliminary stages of the collagen molecules. Unlike proline, hydroxyproline cannot be used for the formation of new collagen. This implies that the hydroxyproline present in biological fluids originates from destructive processes. Now, when eliminating alimentary factors such as the consumption of food containing hydroxyproline, the amount of hydroxyproline in biological fluids is a measure for endogenous collagen catabolism.

In normal physiological conditions collagen anabolism and collagen catabolism are interactive, which means that an increase in collageneous anabolism is attended with an increase in collageneous catabolism. The levels in the blood of components containing hydroxyproline and the excretion in the urine of material containing hydroxyproline are usually not constant, but greatly depend upon age. In the growing periods in the first few years of life and adolescence they are appreciably higher than in adults, if calculated per kilogram of body weight. Although there may be great individual variations in an age-group, the determination of hydroxyproline in biological fluids may be important, for example for tracing disturbances or retardations in growth.

In pathologic conditions, especially those which are attended with specific disturbances in collagen tissues, the determination of hydroxyproline is of even greater importance. A number of diseases such for example as neoplastic growth in collagen tissues, are attended with increased collagen anabolism and catabolism, the biological fluids having a more or less enhanced content of material containing hydroxyproline dependent on the rate of growth of these tumors. The same applies to a number of other syndromes, for example Padget's disease, Marfan's syndrome and osteogenesis imperfecta, often inherited conditions which can be located quickly by means of the determination of hydroxyproline in biological fluids, enabling early medical treatment. Components having a reduced content of hydroxyproline are found in various forms of dwarfism and in the early stages of under-nourishment. Both to the tracing and to the medicamentous or alimentary treatment of these serious deviations the determination of hydroxyproline is of very great importance.

The chemical methods for the determination of hydroxyproline in biological fluids known so far are generally very complicated, for an important part due to the following causes:

(1) In most cases the hydroxyproline is predominantly peptide-bound. For the performance of the determination the amino acid should be in the free state, which mostly necessitates hydrolysis under rather drastic conditions.

(2) The destructed collagen is for the greater part metabolised in the body, in consequence of which the hydroxyproline content of biological fluids is relatively low so that in many cases concentration is required.

(3) Besides free and peptide-bound hydroxyproline biological fluids contain many components which may disturb the determination so that purification before or during the determination is essential.

Among the methods of estimating hydroxyproline known so far the method by means of column chromatography according to Moore and Stein, described in Anal. Chem. 30, 1185–1190 (1958), occupies an important place. By this method, of which there are numerous variants and for which a great many types of automated apparatuses are used, hydroxyproline can be isolated in a pure state and coloured, for example with a reagent containing ninhydrin. The colouring matter formed is determined colorimetrically and is a measure for the quantity of hydroxyproline in the examined sample. For clinical chemistry this method is far from attractive, at least if the determination of hydroxyproline is the only aim, because it is not only expensive and time-consuming, but only allows a small number of determinations a week.

Other well-known quantitative determinations also use colorimetric techniques based on more or less specific colouring of the free hydroxyproline. In these instances, too, the determination is hampered because of the above-mentioned facts. Often the determinations differ only in the measures which are taken in order to eliminate disturbing influences.

The colour reaction usually takes place in two steps. In the first step hydroxyproline is oxidised to a compound of pyrrole structure, viz. pyrrole-2-carboxylic acid and/or pyrrole. The conventional oxidants are hydrogen peroxide, described by Neuman and Logan in J. Biol. Chem. 184, 299 (1950), and the sodium salt of N-chloro-p.toluene-sulphonamide, described by Stegemann in Z. Physiol. Chem. 311, 41 (1958). After removal of the excess of oxidant a reagent is added consisting of p.dimethyl-aminobenzaldehyde in an organic solvent, called Ehrlich's reagent, to obtain a red chromophore. The quantity of this chromophore is determined spectrophotometrically, and is a measure for the quantity of hydroxyproline in the examined sample.

One of the variants of these colorimetric methods which is mostly applied, is the method described by Prockop and Udenfriend in Anal. Biochem. 1, 228 (1960), consisting in that the hydrolysis is performed in an autoclave with concentrated hydrochloric acid for 3 hours at 124° C. In this process a large number of products are produced interfering with the determination, which necessitates a very intensive purification of the hydrolysate. For this purpose the biological fluid is concentrated and the hydrochloric acid applied is removed in a rotary evaporator, the disturbing components being adsorbed on a discolouring resin. The chromogen formed by oxidation of hydroxyproline is extracted with toluene under accurately standardised conditions.

The hydrolysis, the concentration and the purification of the biologiacl fluid are not simple routine operations so that it is obvious that the method mentioned above and similar methods are not suited to be used in clinico-chemical laboratories.

SUMMARY OF THE INVENTION

A process has now been found for the determination of the hydroxyproline content of a biological fluid, characterized in that a sample of the fluid is treated with a strong acetic cation exchange resin adsorbing the free and peptide-bound hydroxyproline present, followed by hydrolysis of the adsorbed peptide-bound hydroxyproline by heating, after which the hydroxyproline is eluted and its content is determined in the eluate by means of a colour reaction.

The method found is a practical and accurate assay in which the concentration of the substance to be determined, the hydrolysis and the removal of aspecific chromogens have been greatly simplified and in many cases can be performed in one analytical procedure.

The most important reagent used in this process is a strong acidic cation exchange resin or it contains such a resin. This reagent is mixed with the biological fluid to be examined to adsorb completely the free and peptide-bound hydroxyproline on the resin. Then the loaded resin can be separated from the remaining biological fluid, for example by sedimentation or centrifugation, and washed to purify and concentrate the resin. It is also possible to perform the determination in the presence of the sample of the fluid if it does not contain any disturbing factors. If required, the resin is re-suspended and then heated, for example, for 3–24 hours at 90–120° C., to hydrolyse completely the hydroxyproline-containing material at the surface of the cation-exchanger. After hydrolysis all the hydroxyproline is bound to the resin as a free amino acid, from which it is eluted by an alkaline liquid such as caustic soda, potassium borate, a sodium carbonate solution and ammonia. In this elution, too, a drastic purification is obtained because a great quantity of the other components of the biological fluid remain adsorbed on the resin.

If one only wants to determine the free hydroxyproline content, the resin need not be hydrolysed. In this caes selective elution of the hydroxyproline from the resin will suffice. Finally the hydroxyproline in the eluate can be determined by any colour reaction known per se, for example, by the method described in the literature mentioned before.

The selection of the resin is very important because this substance must be capable of binding the hydroxyproline-containing components quickly and completely from the biological fluid. Further it must be capable of liberating the hydroproline completely from its peptide-bound position. It is obvious that the resin must not decompose at the desired hydrolysis temperature. Moreover it must be capable of eliminating those factors interfering with the colour reaction. Finally it must not interfere with the colour reaction itself.

In view of these requirements it is to be preferred to use a resin of the sulphonated polystyrene type. The resins with a sulphonated cellulose, dextran or polyphenol matrix have also proved to be useful, especially at lower hydrolysis temperatures.

Further it is to be preferred to use the resin in a finely divided state to bind the hydroxyproline-containing material quickly and completely from the biological fluid. It is not in the first instance of importance whether use is made of a resin with spherical particles or a granulate, but in view of the larger surface per quantity of weight it is preferred to employ a granulate. The particle size of the resin must be small. Because of the surface capacity of the resin it is to be preferred to use particles the diameter of which does not exceed 200 microns. The lower limit is determined by the sedimentability of the resin particles. It is preferred to employ a resin with a particle size of 20–200 microns.

The amount of cross-links in the polysturene matrix of the resin is not of paramount importance. Generally a moderately cross-linked resin with 2–10% cross-links, which on the one hand is very sparingly soluble and on the other hand has sufficiently large pores to attain a rapid exchange of collagen peptides and hydroxyproline, is to be preferred. If desired, the sulphonated polystyrene resin can be applied to the surface of an inert carrier, for example, infusorial earth, such as bentonite or other filter aids. But then the binding capacity per quantity of weight will generally be lower than that of the spherical resins and granulates themselves.

It stands to reason that the resin to be applied must be as pure as possible. Further the resin should be as much as possible of a uniform size. For this purpose the resin is first thoroughly sieved to remove the very fine and coarse particles. Then the resin is thoroughly washed. For this purpose it is heated with aqueous lye, for example, a solution of 2 N sodium hydroxide, then cooled down and then washed with water until neutral reaction of the wash liquid. Then the resin is treated with a dilute mineral acid, for example, nitric acid or 4 N hydrochloric acid. During this treatment the cation exchanger passes into the acid form and is also liberated from disturbing metal ions such as copper ions. Finally the resin is washed with distilled water until neutral reaction of the wash liquid.

A great advantage of the resin applied according to the invention is that the hydroxyproline-containing material is completely hydrolysed under appreciably milder conditions than those arising according to the known methods. When using sulphonated polystyrene resins it is not nocessary to apply strong or dilute hydrochloric acid, which at temperatures above 100° C. causes severe and disturbing decomposition reactions of components of a biological fluid. Hydrolysis occurs already at 60° C., but at this temperature the period of hydrolysis is too long for a quick determination. Above 100° C., for example at 120° C., hydrolysis can sometimes be completed within a few hours, but this makes still other demands upon the hydrolysis tubes, which for safety should be made of extra strong and expensive material. The most practical hydrolysis temperature proved to be 90–100° C. At this temperature hydrolysis can be performed during the night in cheap hydrolysis tubes and no special provisions are required.

The ultimate reagent can be used in many different forms. The acidic cation exchanger can be used in the form of a suspension in distilled water or in a buffer. It is also possible to dry the resin and to dispense the quantity required for a determination in a hydrolysis tube or capsule. Further the resin can be made into tablets disintegrating quickly in biological fluids. The binding agent required for this purpose may consist of, for example, saccharide containing components, but it must not contain any hydroxyproline or other components influencing the determination, especially no ionizable substances.

In some cases the biological fluid must be subjected to a pretreatment. Thus, for example, serum is very rich in high molecular proteins containing no hydroxyproline, which are yet resin-bound but do not completely hydrolyse. In this case the biological fluid must be liberated from the high molecular proteins by a conventional method.

Finally it has been found that it is best to put the reagent into a diagnostic pack ready for use in the clinic. Such a pack chiefly contains the following requisites:

(1) A bottle containing the resin described above, for example, in the form of a suspension or a dry powder, or the latter powder dispensed in capsules in measured quantities or compressed into tablets. Further the resin may be packed in the hydrolysis tubes mentioned under (2).

(2) A number of round-bottomed hydrolysis tubes fitted with an air tight cover, for instance a screw-cap with a rubber or Teflon liner.

(3) One or more standard solutions of hydroxyproline, or readily soluble powders or tablets containing a certain quantity of hydroxyproline.

(4) One or more bottles containing stable reagents for the performance of a colour reaction on hydroxyproline.

DESCRIPTION OF THE PREFERRED EMBODIMENTS

The following examples further illustrate the invention, the essential features of which have been described above.

Example I

A granulated, sulphonated polystyrene resin having in the dry sodium form a particle size of 53–62$\mu$ and containing 8% cross-links was pre-treated with caustic soda, nitric acid and hydrochloric acid and then washed until neutral reaction. Then it was suspended in distilled water to obtain a suspension containing 250 mg. of dry material per ml. The suspension was dispensed in 10-ml. glass tubes fitted with screw-caps in quantities of 1 ml.

A sample of 24 hours urine (1050 ml.) of a female patient 37 years old, suffering from mammacarcinoma, was filtered over a folding filter. One millilitre of urine was pipetted into 2 tubes as described above, numbered (1) and (2). Further 0.1 ml. of water was pipetted into tube (1) and into tube (2) 0.1 ml. of a solution containing 100 $\mu$gm. of hydroxyproline. The tubes were closed carefully, shaken for 10 minutes and then put aside in a stove for 18 hours at 95° C. Then the tubes were cooled down in running tapwater.

After the tubes had been opened 4.1 ml. of 2 N aqueous sodium hydroxide was added, after which the tubes were shaken for 30 minutes. The resin was allowed to settle, after which the supernatant of each tube 2 ml. was pipetted into 2 test tubes bearing a corresponding number. To each of the tubes were added successively: 1 ml. of 0.05 M copper sulphate solution and 1 ml. of 6% hydrogen peroxide solution. Oxidation of the hydroxyproline took place at room temperature for 5 minutes. The excess of hydrogen peroxide was removed by placing the tubes in a water-bath of 70° C. for 10 minutes. Then the mixture was cooled down to room temperature and 4 ml. of 3 N sulphuric acid was added to form pyrrole-2-carboxylic acid. Then 2 ml. of a 5% solution of p-dimethyl-amino-benzaldehyde in n-propanol was added to each tube, whereupon the tubes were heated in a water-bath at 70° C. Then the tubes were cooled down in running tapwater. The red chromophore formed was measured in a colorimeter against distilled water at 553 nanometers. Results obtained: $E_1$ and $E_2$. Then 0.1 ml. of 30% hydrogen peroxide was added to each test tube to destroy the chromophore specifically. After 5 minutes both solutions were measured again at 553 nanometers. The optical densities, which were equal within the limits of the experimental error, amounted to $E_B$.

The total content of hydroxyproline ($X$ $\mu$gm./ml.) in the sample was calculated on the basis of the formula:

$$X = \frac{E_1 - E_B}{E_2 - E_1} \times 100 \ (\mu\text{gm./ml.})$$

Result obtained with the sample of the patient 25.7 $\mu$gm./ml. so that the excretion amounted to 27 mg. per day, which is within the limits of the normal values. So there was no indication of an active bone metastasis.

Example II

A spherical, sulphonated polystyrene resin with 4% cross-links was sieved in a dry acid form to obtain a particle size of 200–400 mesh. Then the resin was washed and dried in accordance with Example I. Then the material was dispensed in capsules in quantities of 275±10 mg.

In a 25-year-old female patient suffering from periarteritis nodosa the hydroxyprolinuria was measured on a few consecutive days in accordance with the following scheme:

Some of the 24 hours urine was filtered and diluted with distilled water (1:4). Two millilitres of dilute urine was pipetted into 2 tubes fitted with a screw-cap and numbered (1) and (2). To tube (1) 0.1 ml. of distilled water was added, to tube (2) 0.1 ml. of a solution of gelatin hydrolysate containing per ml. 1.205 mg. of hydroxyproline in the form of peptides. To each tube the contents of a capsule of resin was added, after which the suspension was shaken vigorously. After closing the 2 tubes were placed in a stove at 90° C. During this period they were again vigorously shaken after 2 and after 4 hours.

Elution, colour reaction and measuring took place in accordance with Example I.

The day excretion ($Y$ mg./day) was calculated on the basis of the formula:

$Y = 2 \times$ (volume 24 hours urine)

$$\times \frac{E_1 - E_B}{E_2 - E_1} \times 0.1205 \ (\text{mg./day})$$

After 3 days, on which successively increased values were found of 76.6–80.4–72.8 mg., the patient was given such a dose of a steroid preparation to obtain on the 10th, the 11th and the 12th day a hydroxyproline excretion of 43.8–41.3–27.9 mg. successively.

Example III

A ground sulphonated polystyrene resin having a particle size ranging from 63 to 87$\mu$ and a degree of "cross-linking" of 5%, was purified and washed according to the process mentioned in Example I. The wet resin was thoroughly mixed with cellulose powder (10% of the dry weight of the resin) and starch solution (containing 5% starch based on the dry weight of the resin). The pasty mass was dried in vacuo, ground and sieved, and the dried powder was fed into a tablet machine. Tablets weighing 310±2.5 mg. were prepared.

Heparinized plasma was prepared from blood of a patient suffering from a rheumatoid disorder. It was deproteinized at 0° C. by adding two times the volume of cold ethanol. After removal of the precipitated plasma proteins the supernatant was diluted with distilled water in the ratio of 1:1 by volume.

In four hydrolysis tubes, marked A, B, C and D, a resin tablet was placed, and into each tube 6 ml. of the diluted supernatant was pipetted. After 15 minutes the suspension was shaken carefully, then centrifuged and the supernatant withdrawn. Into tubes A and B 2 ml. distilled water, and into tubes C and D 2 ml. standard solution (containing 25 $\mu$g. hydroxyproline per ml.), were added. The hydrolysis tubes were screw-capped and carefully shaken. Then tubes A and C were placed in a refrigerator at +4° C., and tubes B and D were placed in a glycerol heating bath at 105° C. overnight.

The next morning the four tubes were processed in an identical manner. The resin was centrifuged and washed twice with 4 ml. distilled water, acidified with hydrochloric acid to pH 2.50. Supernatants were withdrawn, taking care that no resin particles escaped from the tubes. Then the resin was eluted for 30 minutes by adding 10 ml.

potassium borate buffer of pH 8.7 to each tube. After centrifugation 2 ml. of each supernatant was brought into a correspondingly marked reagent tube. Staining was performed after oxidation with 2 ml. 0.02 M aqueous solution of the sodium salt of N-chloro-p-toluenesulphonamide. Excess of this salt was eliminated by adding 10 ml. aqueous 0.63 M perchloric acid. Then 2 ml. 20% p-dimethylaminobenzaldehyde in ethylene glycol monomethyl ether were added, and the tubes were heated in a 70° C. water bath for 20 minutes and then cooled. Optical densities of the solutions were determined according to Example I.

From the optical densities of tubes A and C the content of free hydroxyproline was calculated to be 14 μg. per 1 ml. of plasma; from the optical densities of tubes B and D the content of free and peptide-bound hydroxyproline proved to be 42 μg. per 1 ml. of plasma. Hence the content of peptide-bound hydroxyproline is 28 μg. per 1 ml. plasma from this patient.

The diagnosis of moderate bone damage as a result of rheumatic disorder, was confirmed by X-ray examination of the patient.

Example IV

Diagnostic pack.—A sulphonated polystyrene resin with spherical particles of an average size of 40 mikrons and 2% cross-links was successively treated with nitric acid, caustic soda and hydrochloric acid. The resin was washed until neutral reaction and dried. The powder was dispensed in capsules containing 200±5 mg. of resin each.

A pack was composed containing:
(A) Twelve round-bottomed tubes of borosilicate glass and fitted with screw-caps with Teflon liners. Volume of these tubes: 11 ml.;
(B) A plastic bottle containing 100 capsules of resin;
(C) A glass bottle with screw-cap and fitted with a mark showing 10 ml., containing 10 mg. of hydroxyproline in the hydrochloride form;
(D) A brown glass 200 ml. bottle containing n-propanol;
(E) A capsule containing 10 gm. of p-dimethylaminobenzaldehyde.

This pack comprises all the important chemicals for the determination of the hydroxyproline content of biological fluids. In the laboratory where the determination is performed there should further be available: 30% hydrogen peroxide, 0.05 M copper sulphate solution, 3 N sulphuric acid and 2 N sodium hydroxide solution (caustic soda).

Example V

A pack, as described in Example IV, was opened. The capsule containing p-dimethylamino benzaldehyde (E) was dissolved in n-propanol (D). The standard hydroxyproline (C) was replenished with distilled water till the mark. Standard (C) and reagent (D+E) were stored in a refrigerator at about 4° C. Then we prepared 6% hydrogen peroxide, 3 N sulphuric acid and 2 N caustic soda solutions. The total content of hydroxyproline in the urine was determined in accordance with Example I, but instead of the resin suspension a capsule of resin, as indicated in Example IV, was added to the urine to be examined.

What is claimed is:
1. Process for the determination of the hydroxyproline content of a biological fluid containing both free and peptide-bound hydroxyproline, comprising the steps of:
   (a) contacting a sample of the fluid with a strongly acidic cation exchange resin which adsorbs both the free and the peptide-bound hydroxyproline present;
   (b) hydrolyzing the peptide-bound hydroxyproline adsorbed on the resin by heating;
   (c) eluting the total amount of hydroxyproline present from the resin with an aqueous alkali solution; and
   (d) determining the hydroxyproline content by reacting the hydroxyproline with a reagent capable of producing a color on contact therewith.
2. Process according to claim 1, in which the resin is a sulphonated resin.
3. Process according to claim 2, in which the resin is a sulphonated polystyrene resin.
4. Process according to claim 3, in which the resin has 2–10% cross-links.
5. Process according to claim 2, in which the resin is a sulphonated resin of a particle size of 20–200μ.
6. Process according to claim 1, characterized in that the hydrolysis is performed by the resin at 90–100° C.
7. Diagnostic pack for the determination of the hydroxyproline content of a biological fluid chiefly comprising a bottle containing a strongly acidic cation exchange resin for the adsorption of free and peptide-bound hydroxyproline, at least one tube for the performance of the adsorption and the hydrolysis of the hydroxyproline-containing material by heating, at least one bottle containing a predetermined quantity of a standard solution of hydroxyproline and bottles containing reagents for the performance of a color reaction on contact with hydroxyproline.
8. Diagnostic pack according to claim 7, in which the resin is sulphonated polystyrene.
9. Diagnostic pack according to claim 7, in which the resin is in the form of readily disintegrating tablets.
10. Diagnostic pack according to claim 7, in which the resin has 2–10% cross-links and a particle size of 20–200μ.

References Cited

UNITED STATES PATENTS 2,370,683   3/1945   Palma _____ 23—253TP
3,341,299   9/1967   Catravas _____ 23—230

OTHER REFERENCES

Merck Index, 7th ed., p. 544.
Moore et al.: J. Biol. Chem. 192, 663–681 (1951).
Moore et al.: Anal. Chem. 30, #7, July 1958, pp. 1185–1190.

REUBEN FRIEDMAN, Primary Examiner

R. M. REESE, Assistant Examiner

U.S. Cl. X.R.
23—253; 260—326.3